United States Patent [19]

Sakai et al.

[11] Patent Number: 4,656,533
[45] Date of Patent: Apr. 7, 1987

[54] FLOPPY DISC DRIVE UNIT

[75] Inventors: Junichi Sakai; Fujio Itoh, both of Yokohama; Seiichi Watanabe, Kawasaki, all of Japan

[73] Assignee: Matsushita Electric Industrial Co., Ltd., Kadoma, Japan

[21] Appl. No.: 663,173

[22] Filed: Oct. 22, 1984

[30] Foreign Application Priority Data

Oct. 20, 1983 [JP] Japan .................................. 58-196354

[51] Int. Cl.[4] .......................... G11B 15/14; G11B 5/09; G11B 15/46
[52] U.S. Cl. ........................................ 360/65; 360/46; 360/73
[58] Field of Search ........................ 360/25, 31, 65, 46, 360/51, 73, 67

[56] References Cited

U.S. PATENT DOCUMENTS 3,465,321 9/1969 Reisfeld .................................. 360/67
4,371,901 2/1983 Shah ....................................... 360/65

Primary Examiner—Vincent P. Canney
Attorney, Agent, or Firm—Cushman, Darby & Cushman

[57] ABSTRACT

In a floppy disc drive unit, the rotational speed of a floppy, a write current fed to a write head, electric characteristic of a signal processing circuit in a read circuit are all controlled so as to set them to values suitable for selected mode corresponding to magnetic recording data density. A switching signal is either manually produced or fed from an external circuit so as to effect switching between normal density mode and high density mode. The floppy disc drive unit according to the present invention is therefore capable of handling floppy discs of different density values.

11 Claims, 21 Drawing Figures

FLOPPY DISC DRIVE UNIT

BACKGROUND OF THE INVENTION

This invention relates generally to magnetic recording and reproducing, and more particularly to a floppy disc drive unit used as an auxiliary storage device of a computer.

Floppy discs are now widely used, and floppy discs on the market can be classified into two groups, one being a normal density type, and the other being a high density type. Normal density type and high density type respectively indicate the density of data to be written or recorded on a floppy disc, i.e. the amount of data written per unit area. These two types relating to data density are standardarized. Because of the difference in type, floppy discs of each type are used in particularly designed floppy disc drive units for the type. The following table shows characterstics of normal density recording and high density recording.

TABLE 1

| ITEM | NORMAL-DENSITY | HIGH-DENSITY | UNIT |
|---|---|---|---|
| COERSIVE FORCE | 300 | 600 | Oersted |
| MEDIUM THICKNESS | 2.5 | 1.5 | micron |
| ROTATIONAL SPEED | 300 | 360 | rpm |
| CUTOFF FREQ. OF LPF | 300K | 400K | Hz |
| RESONANT FREQ. OF DIFFERENTIATOR AMP | 350K | 500K | Hz |
| STORAGE CAPACITY | 1 M | 1.6 M | byte |
| DATA TRANSFER SPEED | 250K | 500K | bit/s |
| NUMBER OF TRACKS | 80 | 70 | — |

As will be understood from the above table, a floppy disc drive unit designed and manufactured so as to handle exclusively either normal density floppy discs or high density floppy discs cannot be used for the other type floppy discs. Therefore, two different sorts of floppy disc drive units must be prepared so that either type of floppy disc can be used. However, it is time-consuming and troublesome to change floppy disc drive units whenever different type floppy discs are used.

SUMMARY OF THE INVENTION

The present invention has been developed in order to remove the above-described drawbacks inherent to the conventional floppy disc drive units.

It is, therefore, an object of the present invention to provide a new and useful floppy disc drive unit which is capable of handling floppy discs of different densities known as normal density and high density.

According to a feature of the present invention a switching signal indicating either a normal density mode or a high density mode is applied to a motor drive circuit which controls the rotational speed of a used floppy disc, as well as to write circuit and read circuit respectively so that rotational speed of the floppy, write current fed to a write head and electric characteristics in a reproduced signal processing in the read circuit are all changed to be suitable for a selected density mode. As a result, a single floppy disc drive unit according to the instant invention can be used in common for floppy discs of both types, i.e. normal density floppy discs and high density floppy discs.

In accordance with the present invention there is provided a floppy disc drive unit with a motor for rotating a floppy disc and a magnetic head assembly for writing and/or reading information on and/or from said floppy disc, comprising: switching signal generating means for generating a switching signal indicative of a selected mode relating to magnetic recording characteristic of a floppy disc to be used; motor drive means responsive to said switching signal for causing said motor to rotate at different speeds in accordance with said selected mode; and a write circuit and/or a read circuit coupled to said magnetic head assembly, said write circuit generating a write current fed to said magnetic head assembly for writing information, said write circuit having means responsive to said switching signal for controlling a write current fed to said magnetic head assembly so as to write information with a write current suitable for said selected mode, said read circuit being responsive to read out signal from said magnetic head assembly for producing a reproduced signal, said read circuit having means responsive to said switching signal so as to process said read out signal with a characteristic suitable for said selected mode.

In accordance with the present invention there is also provided a floppy disc drive unit with a motor for rotating a floppy disc and a magnetic head assembly for writing and/or reading information on and/or from said floppy disc, comprising: switching signal generating means for generating a switching signal indicative of a selected mode relating to magnetic recording characteristic of a floppy disc to be used; motor drive means responsive to said switching signal for causing said motor to rotate at different speeds in accordance with said selected mode; a write circuit for generating a write current fed to said magnetic head assembly for writing information via a write head of said magnetic head assembly, said write circuit having means responsive to said switching signal for controlling a write current fed to said magnetic head assembly so as to write information with a write current suitable for said selected mode; a delay circuit for retarding a write-command signal by a variable delay time which is varied in accordance with said switching signal; and an erase circuit for supplying an erase current to one or more erase head of said magnetic head assembly so as to partially erase a portion written by said write head, said erase circuit being responsive to said switching signal so as to change the erase current to be suitable for said selected mode, said erase current being fed to said erase head(s) with a timing determined by said delay circuit.

In accordance with the present invention there is further provided a floppy disc drive unit with a motor for rotating a floppy disc and a magnetic head assembly for writing and/or reading information on and/or from said floppy disc, comprising: switching signal generating means for generating a switching signal indicative of a selected mode relating to magnetic recording characteristic of a floppy disc to be used; motor drive means responsive to said switching signal for causing said motor to rotate at different speeds in accordance with said selected mode; a read circuit responsive to read out signal from said magnetic head assembly for producing a reproduced signal, said read circuit including a low pass filter responsive to said read out signal, the curoff frequency of said low pass filter being changed in accordance with said switching signal; a differentiator/amplifier responsive to an output signal from said low pass filter, a resonance frequency on differentiating being changed in accordance with said switching signal; and a time-domain filter responsive to an output signal from said differentiator/amplifier for converting the same into a pulse waveform, the width of each pulse being changed in accordance with said switching signal.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing the preferred embodiment of the present invention, a conventional floppy disc drive unit or apparatus will be described for a better understanding of the present invention with reference to FIGS. 1 and 2.

Figure 1:
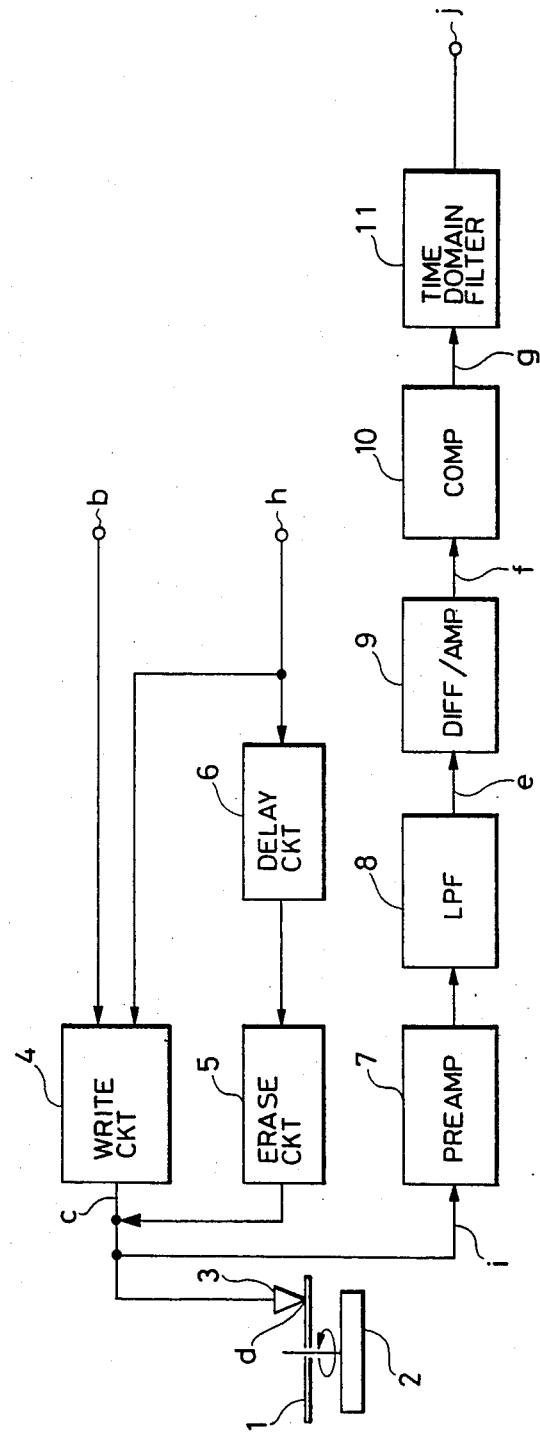
FIG. 1 is a block diagram of a conventional floppy disc drive unit.
Figure 2:
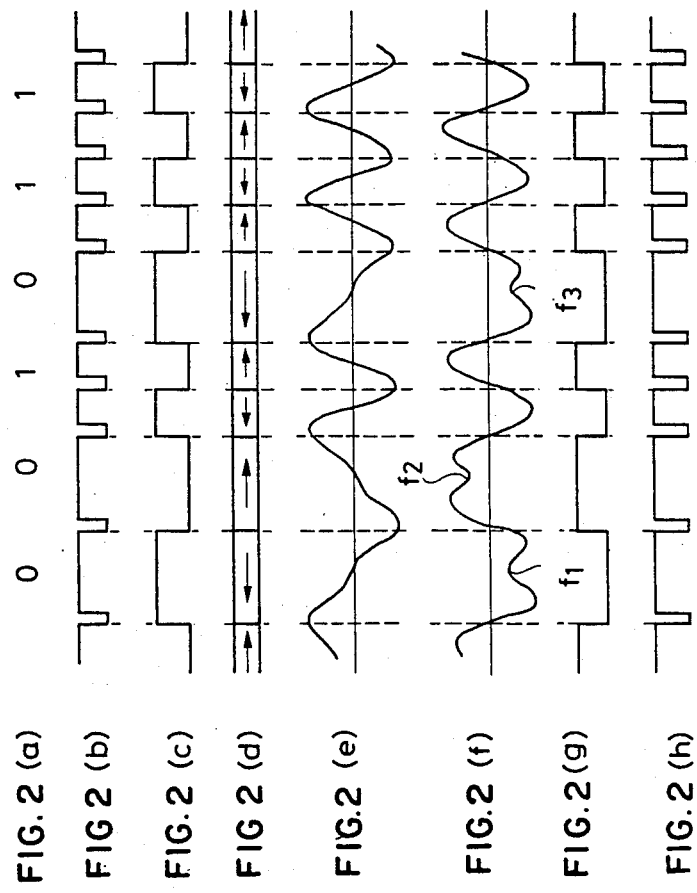
FIG. 2 consisting of (a) through (h) is a waveform chart useful for understanding the conventional unit of FIG. 1 as well as a following embodiment of the present invention.

FIG. 1 shows a block diagram of a conventional floppy disc drive unit, while FIG. 2 is a waveform chart showing various signals in the unit. The waveform chart in FIG. 2 will also be used for the description of an embodiment of the present invention. In FIG. 1, the reference 1 is a floppy disc, i.e. a flexible magnetic recording medium, which is detachable from the floppy disc drive unit. The floppy disc 1 is arranged to be rotated by a spindle motor 2, and signal recording/reproducing is effected via a magnetic head 3 which comes into contact with the floppy 1.

In the case of recording a signal on the floppy disc 1, a writing signal "b" is fed to a write circuit 4, and an output signal therefrom (see FIG. 2 (c) ) is recorded through the magnetic head 3. The floppy disc 1 is magnetized by way of a voltage shown in FIG. 2 (c) as shown in FIG. 2 (d). At right and left ends in a direction of progress of the magnetic head 3 are mounted erase heads (not shown) used for preventing erroneous detection on reproduction. Since the erase heads are located behind the magnetic head 3 in a direction of the progress, a delay circuit 6 is provided to retard a writing gate signal "h" which is fed to the erase heads via an erase circuit 5.

In the case of reproducing a signal from the floppy disc 1, a signal "i" from the magnetic head 3 is first detected, and is amplified by a preamplifier 7. Then noise components are removed by a low pass filter 8 (see FIG. 2 (e)), and an output signal from the low pass filter 8 is fed to a differentiator/amplifier 9. A signal "f" differentiated within the differentiator/amplifier 9 is inputted to a comparator 10 arranged to vary its output signal "g" as "0" to "1" or "1" to "0" when the voltage of the input signal "f" crosses zero volt. The output signal is then inputted to a time-domain filter 11, and when the signal "g" changes such as "0" to "1" or "1" to "0", a pulse is outputted. In this way, an output signal "j", which varies in the same manner as the input signal "b", is produced and is fed to external circuits.

Figure 3:
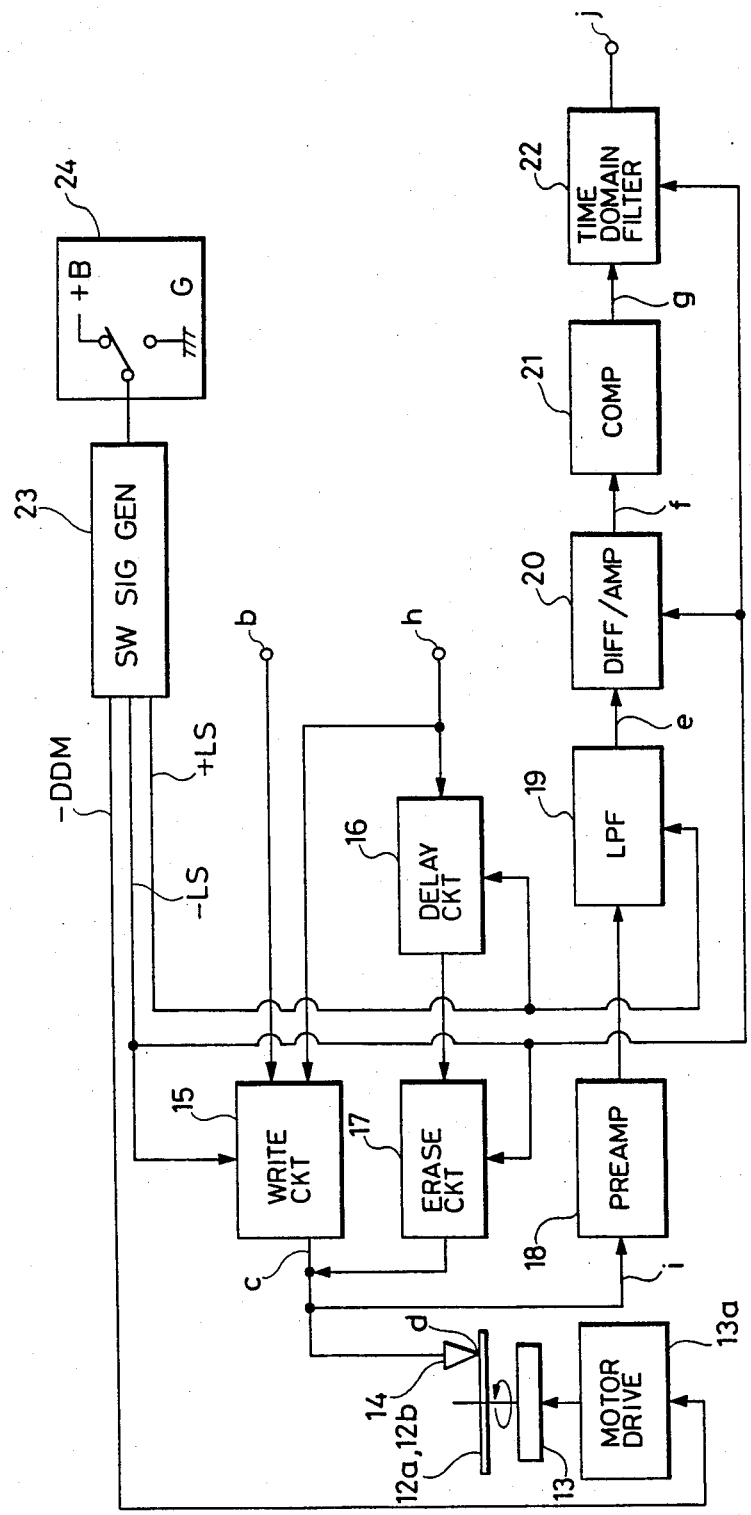
FIG. 3 is a scehmatic block diagram of an embodiment of a floppy disc drive unit according to the present invention.
Figure 4:
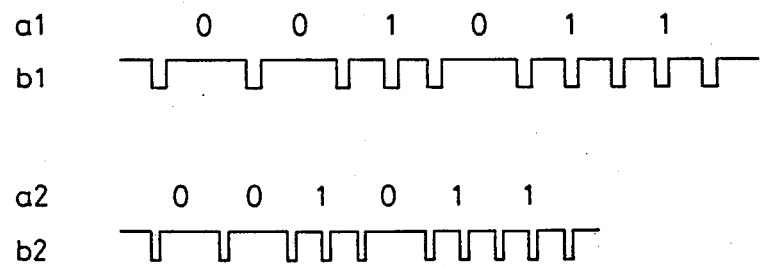
FIG. 4 consisting of a,b, and $a_2 b_2$ is a waveform chart of data to be written on or read out from a normal density floppy disc and a high density floppy disc.

Referring now to FIGS. 3 and 4, an embodiment of the floppy disc drive unit according to the present invention will be described, where FIG. 3 is a block diagram and FIG. 4 is a waveform chart.

In FIG. 3, the reference 12a F is a floppy disc, i.e. a flexible magnetic recording medium, which is detachable from the floppy disc drive unit. This floppy disc, indicated at the reference 12a, is of normal density type, namely, it has a coersive force of 300 Oersted for instance, and a thickness of a magnetic layer of 2.5 micrometer. The reference 12b is used to indicate a floppy disc of high density type, having a coersive force of 600 Oersted for instance and a thickness of a magnetic layer of 1.5 micrometer. In the following description, these floppy disc are simply referred to as normal density floppy disc and a high density floppy disc. Furthermore, a mode for handling the normal density floppy disc 12a and another mode for handling the high density floppy disc 12b will be respectively referred to as normal density mode and high density mode hereinafter.

The reference 13 is a spindle motor which drives the floppy disc 12a or 12b. The spindle motor 13 is responsive to a signal from a motor drive circuit 13a receiving a switching signal (−DDM) so as to change the rotational speed from 300 rpm to 360 rpm or vice versa.

The reference 14 is a magnetic head assembly which is capable of writing and reading on and from the floppy discs of either normal density type or high density type. The reference 15 is a write circuit which converts a writing data signal "b" controlled by a writing gate signal "h", into a write current C suitable for either normal density or high density mode in accordance with a switching signal (−LS), and this write current C is fed to the magnetic head 14 assembly. A delay circuit 17n and an erase circuit 16 are both provided for preventing erroneous detection on reproduction in the same manner as in the conventional example, and the delay time is changed so that a different delay time is provided respectively for normal density mode and high density mode.

In the case that signals are reproduced from the floppy discs 12a and 12b, a signal "i" from the magnetic head assembly 14 is detected, which is amplified by a preamplifier 18, and noise components are removed by way of a low pass filter 19. This low pass filter 19 is controlled by a further switching signal (+LS) so as to set a cutoff frequency thereof to be suitable for either high density or normal density mode, for instance 300 KHz or 400 KHz. This is effected for correcting center frequency deviation (peak shift) on reproduction at an inner portion of the floppy disc.

A differentiator/amplifier 20 selects a resonant frequency, 350 KHz or 500 KHz, which is suitable for high density or normal density mode, in accordance with the switching signal −LS so as to reduce the change in gain, removing unnecessary high frequency range noise thereby suppressing jitter. The differentiator/amplifier 20 differentiates its input signal and outputs a resultant differentiated signal.

A comparator 21 has the same structure as that used in the conventional example, so that its output signal "g" changes such as "0" to "1" or "1" to "0", whenever the voltage of its input signal "f" crosses zero volts. This output signal "g" is fed to a time-domain filter 22, and when the signal "g" changes, a pulse signal is outputted so as to output the same signal "j" as the signal "b". This signal "j" is outputted as a read out pulse signal to an external circuit. The time-domain filter 22 is responsive to the switching signal −LS so as to switch a malfunction-avoiding circuit built in the time-domain filter 22 using the switching signal −LS.

The reference 23 is a switching signal generator which generates the above-mentioned three kinds of switching signals −DDM, +LS and −LS. The switching signal generator 23 is reponsive to a manual switch 24 which may be connected to a power source side +B or ground side G. When a movable contact of the manual switch 24 is turned to power source side +B, a positive voltage is fed to the switching signal generator 23. In this way, logic levels of the three switching signals −DDM, −LS and +LS are controlled so that they assume either logic "1" or "0". The manual switch 24 is provided for designating either normal density or high density mode so as to control the entire floppy disc drive unit according to the present invention to be suitable for a floppy disc of either one of a selected density type. Although the switching between normal density mode and high density mode is manually effected in the illusrated embodiment, this manual switch 24 may be replaced with a circuit which produces high or low signal by detecting the type of a used floppy disc. For instance, the switch 24 may be replaced with a host computer which is responsive to a read out signal from the used floppy. In this case, when the read out signal cannot be recognized as normal data, then it is determined that the set mode is wrong, and a high or low signal is produced to cause the switching signal generator 23 to produce appropriate switching signals with which the set mode is changed to another mode.

In the case that the normal density mode has been selected or designated, the logic levels of these switching signals are such that −DDM is of logic "0", −LS being of logic "0", and +LS being of logic "1". On the other hand, in the high density mode, −DDM is of logic "1", and +LS being of logic "0". The polarity of −DDM is always the same as that of −LS. The reason that two signals −DDM and −LS varying identically are provided is that it is desired that the motor drive circuit 13a, which consumes a relatively large current, is fed with the signal −DDM, which is of large current capacity. In other words, it is intended to ensure the application of a large-amount current to the motor drive circuit 13a separately from the signal −LS fed to other electronic circuits.

FIG. 4 shows normal density data a1, and its corresponding writing signal b1, as well as high density data a2 and its corresponding writing signal b2. As is understood from FIG. 4, the writing signal b1 for normal density and the other writing signal b2 for high density have an identical voltage and different frequencies.

The above-mentioned embodiment operates as follows. When it is intended to record or reproduce a signal on and from the floppy disc 12a of normal density type, the manual switch 24 shown in FIG. 3 is turned to a normal density side, then the rotational speed of the spindle motor 13 is set to 300 rpm, and the write current in the writing circuit 15 as well as the erase current in the erase circuit 16 are both set to values suitable for normal density. Furthermore, on reproduction in normal density mode, the cutoff frequency of the low pass filter 19 is set to 300 KHz, while the resonant frequency of the differentiator/amplifier 20 is set to 350 KHz, the time constant of the time-domain filter 22 being set to one half that used for high density floppy disc.

When the high density floppy disc 12b is used, the manual switch 24 is turned to high density side. Then the rotational speed of the spindle motor 13 is changed to 360 rpm, while the writing signal and the erase signal are respectively set to values which are twice and 1.4 times the values set for normal density mode. Furthermore, the cutoff frequency of the low pass filter 19 is set to 400 KHz, while the resonant frequency of the differentiator/amplifier 20 is set to 500 KHz, and the time constant of the time-domain filter 22 is set to a doubled value of the normal density value.

In this way, either of the normal density floppy disc 12a and the high density floppy disc 12b may be used for writing and reading with the manual switch 24 being suitably operated. As shown in Table 1, in the normal density floppy disc 12a, the storage capacity is 1M byte, data transfer speed being 250 Kbit/sec, the number of tracks being 80, the thickness of the magnetic layer being 2.5 micrometers. On the other hand, in the high density floppy disc 12b, the storage capacity is 1.6M byte, data transfer speed being 500Kbit/sec, the number of tracks being 70, the thickness of the magnetic layer being 1.5 micrometers.

The embodiment illustrated in FIG. 3 will be described in detail in connection with respective blocks.

Figure 5:
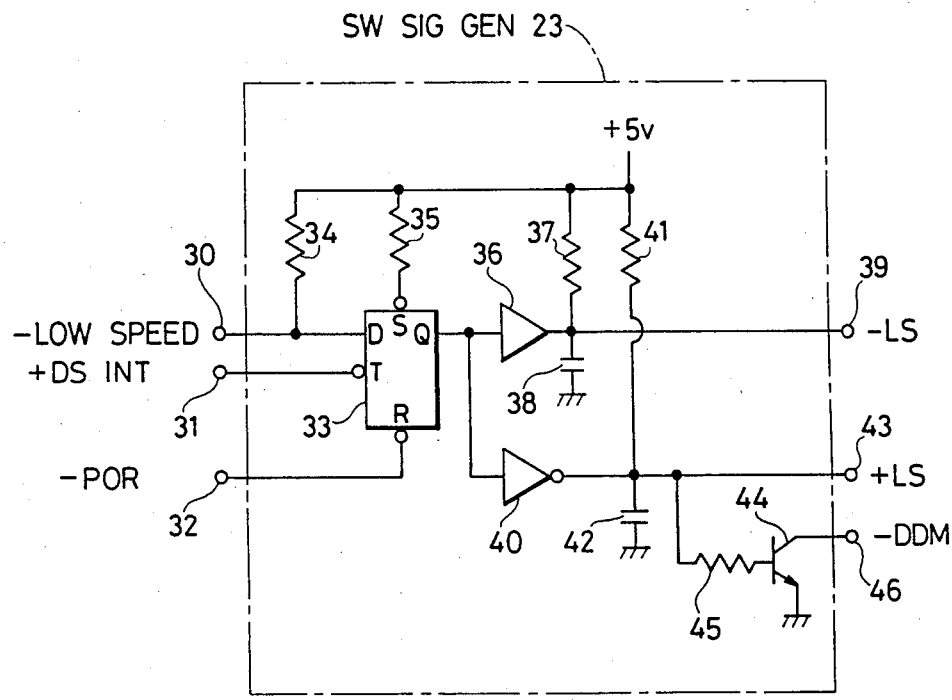
FIG. 5 is a circuit diagram of the switching signal circuit shown in FIG. 3.

FIG. 5 shows a block diagram of the switching signal generator 23. In FIG. 5, the reference 30 is a terminal for receiving a −LOW SPEED signal which assumes logic "0" or "1" in accordance with the state of the manual switch 24. In detail, logic "0" is applied to the 30 terminal when normal density mode is selected, and logic "1" is applied to the same when high density is selected. The reference 31 is a terminal to which an internal drive select signal +DS INT is applied. When logic "0" is applied to the terminal 31, the floppy disc drive unit is put in operable state, and when logic "1" is applied to the same, the unit is disabled. The reference 32 is a terminal for receiving a POWER-ON-RESET signal −POR which assumes logic "0" when power is supplied. The reference 33 is a D flip-flop whose output Q changes as "0" to "1" or "1" to "0" when an input signal at T input terminal changes from "1" to "0" within a period where D input terminal receives "1" signal. The reference 34 is a pull-up resistor which holds the voltage at D terminal at "1" unless the −LOW SPEED voltage at the terminal 30 becomes "0". The reference 35 is a pull-up resistor which inhibits setting of the D flip-flop 33. The reference 36 is a buffer amplifier which performs current amplification of a Q output of the D flip-flop 33. The reference 37 is a pull-up resistor which holds "1" unless the buffer amplifier 36 produces "0". The reference 38 is a capacitor which lowers the output impedance of the buffer amplifier 36. The reference 39 is a first output terminal for the low signal —LS which assumes logic "0" in the normal density mode. The reference 40 is an inverter which inverts the Q output of the flip-flop 33 such as "0" to "1" or "1" to "0". The reference 41 is a pull-up resistor which holds "1" unless the inverter 40 produces "0". The reference 42 is a capacitor for lowering the output impedance of the inverter 40. The reference 43 is a second output terminal for the other low signal +LS assuming logic "1" in the normal density mode. The reference 44 is a switching transistor of npn type. The reference 45 is a bias resistor connected between the output terminal of the inverter 40 and the base of the transistor 44. The reference 46 is a third output terminal for outputting the direct-drive-motor —DDM signal used for starting and stopping the spindle motor 13. This third output terminal 46 is an open-collector terminal of the transistor 44.

The switching signal generator 23 of FIG. 5 operates as follows. When a power switch (not shown) of the unit is turned on, the —POR signal at the terminal 32 becomes "0". This "0" signal is fed to a reset terminal R of the flip-flop 33 so as to reset the same such that Q output assumes a "0" state. As a user or an operator select the floppy disc drive unit shown in FIG. 3, +DS INT signal at the terminal 31 becomes "0", and then the value of Q output of the flip-flop 33 varies in accordance with the —LOW SPEED signal applied to the terminal 30. Namely, when —LOW SPEED signal at the terminal 30 is of logic "0" (in the normal density mode), the Q output is "0". On the other hand, when —LOW SPEED signal at the terminal 30 is of logic "1" (in the high density mode), the Q output assumes "1". When Q output is a "0", the first output terminal 39 is "0", the second output terminal 43 being of "1", and the third output terminal 46 being "0". When Q output is "1", the first output terminal 39 is "1", the second output terminal 43 being "0", and the third output terminal 46 assuming a high impedance.

Figure 6:
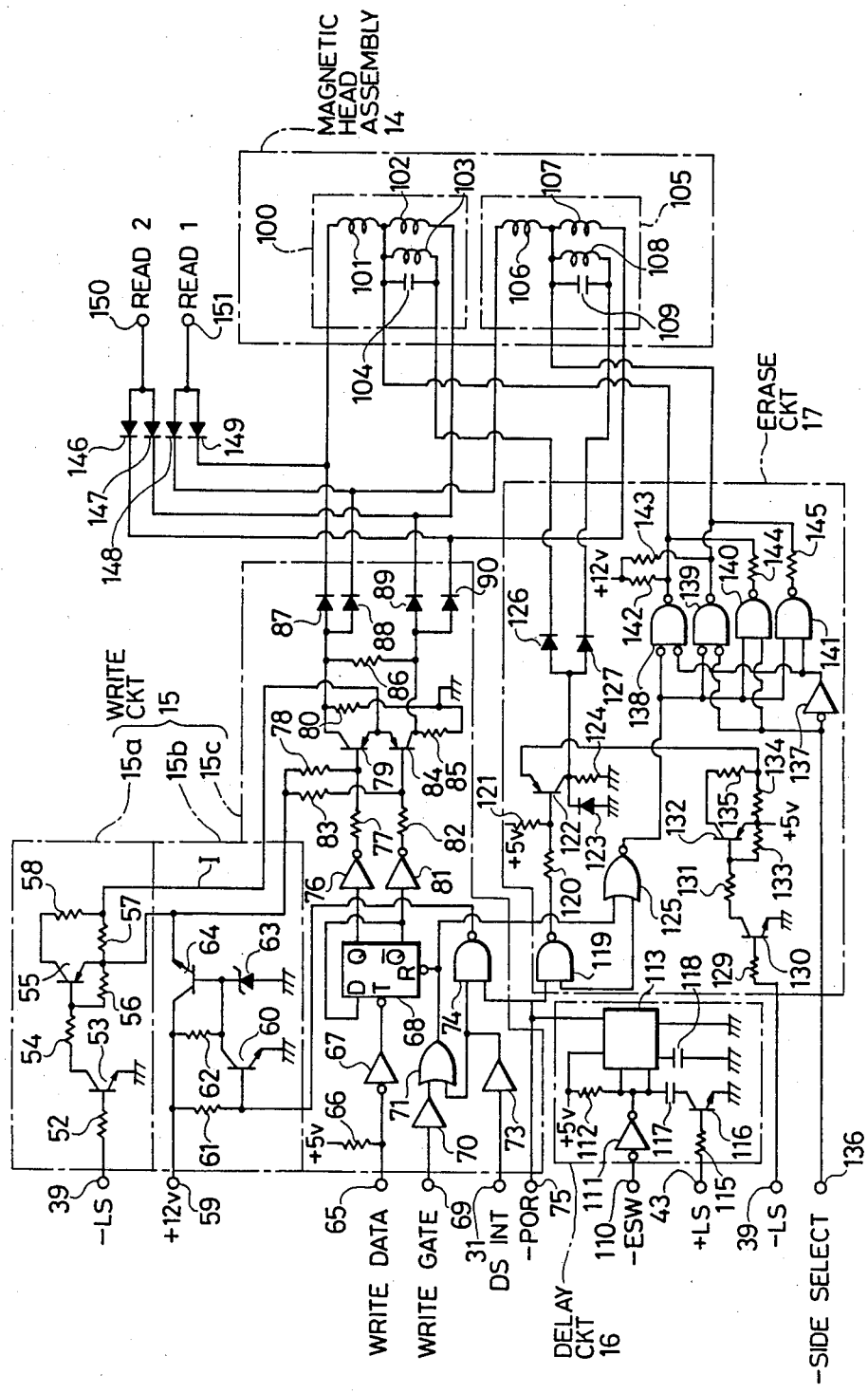
FIG. 6 is a circuit diagram of the write circuit, delay circuit, erase circuit all shown in FIG. 3.

FIG. 6 shows the write circuit 15, the delay circuit 16, the erase circuit 17, the magnetic head assembly 14, and other peripheral circuits. The write circuit is generally designated at 15, and comprises a writing current switching circuit 15a, a regulated power supply cirucit 15b, and a writing-driving circuit 15c.

In the writing current switching circuit 15a of FIG. 6, the reference 39 indicates the first switching signal —LS terminal connected to or corresponding to the —LS signal terminal 39 shown in FIG. 5. The reference 53 is a transistor whose base is connected via a resistor 52 to the terminal 39. The reference 55 is another transistor whose base is connected via a resistor 54 to the collector of the transistor 53. Between the emitter and base of the transistor 55 is connected a resistor 56, while two resistors 57 and 58 connected in series are connected between the emitter and the collector of the same. A voltage from the regulated power supply circuit 15b is applied to the emitter of the transistor 55.

In the writing current switching circuit 15a, since the —LS signal at the terminal 39 is of "0" in the normal density mode, the transistors 53 and 55 are made nonconductive. Therefore, the voltage from the regulated power supply circuit 15b is fed via only the resistor 57 to the writing-driving circuit 15c as a current I.

In the high density mode, since the —LS signal at the terminal 39 becomes "1", the transistors 53 and 55 become conductive in the writing current switching circuit 15a. As a result, the voltage from the regulated power supply circuit 15b is fed via the emitter-collector path of the transistor 55 in parallel to the resistor 57. Accordingly, the total current I fed into the writing-driving circuit 12c is defined by a combined resistance value of the resistors 57 and 58, and therefore the current I is greater than a current defined by only the resistor 57.

In this way, the current I fed to the writing-driving circuit 15c is controlled in accordance with the logic level of the switching signal —LS at the terminal 39. More specifically, when the —LS signal is of "0" (i.e. normal density), a small current flows, and on the other hand, when the —LS signal is of "1" (i.e. high density), a large current flows.

In the regulated power supply circuit 15b, the reference 59 is a +12 V terminal, which is connected via a resistor 61 to base of a transistor 60, and also via a resistor 62 to collector of the transistor 60. Emitter of the transistor 60 is grounded, while the collector of the same is connected to base of another transistor 64 and to cathode of a zenner diode 63 whose anode is grounded. Collector of the transistor 64 is connected to the +12 V terminal 59, while emitter of the same is connected to emitter of the transistor 55 of the writing current switching circuit 15a.

The regulated power supply circuit 15b is arranged such that base of the transistor 60 is of "0", a voltage is outputted from the emitter of the transistor 64. Namely, when base of the transistor 60 is of "0", the transistor 60 is rendered nonconductive, and therefore +12 V flows into the zenner diode 63 via the resistor 62. As a zener voltage from the zener diode 63 is applied to base of the transistor 64, a regulated voltage is outputted from the emitter of the transistor 64.

The writing data (see b1 and b2 in FIG. 4) having a pulse waveform is inputted to WRITE DATA terminal 65 of the writing-driving circuit 15c. The reference 67 is an inverter whose input is set to +5 V, namely, logic "1" state, because of connection via a resistor 66 to +5 V line, in the case no signal is fed to the WRITE DATA terminal 65. The reference 68 is a D flip-flop whose T terminal is connected to an output terminal of the inverter 67, and R terminal being connected to an output terminal of an OR gate 71.

One input terminal of the OR gate 71 is connected via a buffer amplifier 70 to a WRITE GATE terminal 69, and the other input terminal of the OR gate 71 is connected via another buffer amplifier 73 to the terminal 31 receiving the DS INT signal.

The above-mentioned D flip-flop 68 inverses its Q output when T input turns from "1" to "0" since inverted information $\overline{Q}$ of Q output is inputted to the D input. With this operation, the D flip-flop 68 divides the frequency of T input by two.

The reference 76 is an inverter, whose input is connected to the Q output of the D flip-flop 68. The inverter 76 drives a transistor 79 via a resistor 77. The transistor 79 receives at its base the regulated voltage, i.e. output from the transistor 64, through a resistor 78, and the above-mentioned writing current I at its emitter. Collector of the transistor 79 is grounded via a resistor 80.

Similarly, the reference 81 is an inverter, whose input is connected to the $\overline{Q}$ output of the D flip-flop 68. The inverter 81 drives a transistor 84 via a resistor 82. The transistor 84 receives at its base the regulated voltage, i.e. output from the transistor 64, through a resistor 83, and the above-mentioned writing current I at its emitter. Collector of the transistor 84 is grounded via a resistor 85.

Between collectors of the transistors 79 and 84 is provided a resistor 86. Collector of the transistor 79 is connected via a diode 87 to a write/read coil 101 of a first magnetic head 100. The collector of the transistor 79 is further connected via another diode 88 to a write/read coil 106 of a second magnetic head 105. The first and second magnetic heads 100 and 105 are both included in the magnetic head assembly 14 as will be described hereinlater.

Similarly, collector of the transistor 84 is connected via a diode 89 to a write/read coil 102 of the first magnetic head 100. The collector of the transistor 84 is further connected via another diode 90 to a write/read coil 107 of the second magnetic head 105.

The reference 75 is a terminal for receiving the POWER-ON-RESET −POR signal assuming "0" for a given period of time immediately after the power is turned on. The reference 74 is a NAND gate whose one input is connected to the −POR signal terminal 75. To the other input terminal of the NAND gate 74 is connected to an output terminal of the buffer amplifier 73 responsive to the internal drive select DS INT signal at the terminal 31. An output terminal of the NAND gate 74 is connected to base of the transistor 60.

Nextly, the delay circuit 16 and the erase circuit 17 also shown in FIG. 6 will be described. The reference 110 is an input terminal for receiving a signal −ESW indicating that erasing is possible. The reference 43 is a terminal for receiving the second switching terminal (+LS) assuming "1" in the case of driving the normal density floppy disc 12a. The reference 113 is an integrated circuit functioning as a monostable (one-shot) multivibrator, which is simply referred to as MSMV IC. This MSMV IC 113 connected to an CR time-constant determinining circuit including a resistor 112 and a capacitor 118, is connected to a positive voltage source terminal +5 V so that an output time of the output voltage is determined by the time constant. The MSMV IC 113 is responsive to −ESW signal sent thereto via a buffer 111 such that it starts outputting an output voltage when −ESW turns to "0". In the case of normal density floppy, since the signal +LS at the input terminal 43 is of logic "1", a transistor 116 whose base is connected via a resistor 115 to the input terminal 43, becomes conductive, and therefore a capacitor 117 connected to collector of the transistor 116 is grounded. As a result, the capacitor 117 is connected in parallel to the capacitor 118, increasing capacitance determining the time constant thereby causing the MSMV IC 113 to output a longer output signal than before. This output signal from the MSMV IC 113 is fed to a NAND gate 119 and a NOR gate 125.

This NAND gate 119 receives the output signal from the IC 113 and also the −POR signal from the input terminal 75, and an output terminal of the NAND gate 119 is connected via a resistor 120 to base of a transistor 122. This transistor 122 receives +5 V fed via a resistor 121 to base thereof. Collector of the transistor 122 is grounded via a resistor 124. A diode 123 is connected in parallel with the resistor 124 where the anode of the diode is grounded. The collector of the transistor 122 is further connected to anodes of diodes 126 and 127. The cathode of the diode 126 is connected to an erase coil 103 of the first magnetic head 100, while the cathode of the diode 127 is connected to an erase coil 108 of the second magnetic head 105. A noise reducing capacitor 104 is connected in parallel to the erase coil 103. Similarly, another noise reducing capacitor 109 is connected in parallel to the erase coil 108. When the output of AND gate 138 or 140 turns "0", a current is fed from the transistor 122 to the erase coil 103 or 108 so as to perform erasing.

The erase circuit 17, which has been partially described in the above, will be further described in detail. The reference 39 is an input terminal for receiving −LS signal assuming "0" in the case of normal density floppy. This terminal 39 is connected via a resistor 129 to base of a transistor 130 so that the resistor 129 gives appropriate base bias. Emitter of the transistor 130 is grounded, while collector of the same is connected to a bias resistor 131. A positive voltage supply terminal +5 V is connected to emitter of the transistor 132, and is connected via a resistor 133 to base of the same, and furthermore via resistors 134 and 135 to the collector of the same. A junction connecting the resistors 134 and 135 is connected to emitter of the transistor 122.

In the erase circuit 17, since the transistor 130 does not become conductive when the signal −LS is of "0", i.e. in the case of normal density, the transistor 132 does not also become conductive. Therefore, +5 V is applied via only the resistor 134 to emitter of transistor 122. On the other hand, when −LS is of "1", i.e. in the case of high density, the transistor 130 becomes conductive, and therefore the transistor 132 also becomes conductive allowing the +5 V to be fed to the emitter of the transistor 122 via a parallel circuit of the resistors 134 and 135.

The reference 136 is an input terminal for receiving a −SIDE SELECT signal which assumes "1" for driving the first magnetic head 100 and "0" for driving the second magnetic head 105. The reference 137 is an inverter whose input terminal is connected to the input terminal 136 for receiving the −SIDE SELECT signal, and whose output is connected to inputs of AND gates 138 and 141. The input terminal 136 is directly connected to inputs of AND gates 139 and 140. The other input terminals of the AND gates 138 to 141 are all connected to the output of the NOR gate 125.

The relationship between the AND gates 138 to 141, the NOR gate 125, and the −SIDE SELECT signal at the input terminal 136 are summarized as follows:

(1) When NOR gate 125="0", −SIDE SELECT="0", since output of the inverter 137 is of "1", outputs of AND gates 138, 140 and 141="1", and outputs of AND gates 139="0".

(2) When NOR gate 125="0", −SIDE SELECT="1", since output of the inverter 137 is of "0", outputs of AND gates 139, 140 and 141="1", and outputs of AND gates 138="0".

(3) When NOR gate 125="1", −SIDE SELECT="0", since output of the inverter 137 is of "0", outputs of AND gates 138, 139 and 140="1", and outputs of AND gates 141="0".

(4) When NOR gate 125="1", −SIDE SELECT="0", since output of the inverter 137 is of "1", outputs of AND gates 138, 139 and 141="1", and outputs of AND gates 140="0".

The operation of the NAND gates 138 through 141 is as follows:

(1) In the case that the NAND gate 138 is of "0".

A voltage at a center point of coils 101 to 103 of the first magnetic head 100 of the head assembly 14 becomes 0V, and therefore only the erase coil 103 operates allowing the first magnetic head 100 to assume writable state.

(2) In the case that the NAND gate 139 is of "0".

A voltage at a center point of coils 106 to 108 of the second magnetic head 105 of the head assembly 14 becomes 0 V, and therefore only the erase coil 108 operates allowing the second magnetic head 105 to assume writable state.

(3) In the case that the NAND gate 140 is of "0".

A voltage at a center point of coils 101 to 103 of the first magnetic head 100 of the head assembly 14 becomes 6 V, and therefore the erase coil 103 is disabled. This is because no current flows into the erase coil 103 since the center point asummes 6 V since the value of the resistor 144 is made equal to that of the resistor 142. At this time, the first magnetic head 100 is in readable state.

(4) In the case that the NAND gate 141 is of "0".

A voltage at a center point of coils 106 to 108 of the second magnetic head 105 of the head assembly 14 becomes 6 V, and therefore the erase coil 108 is disabled. This is because no current flows into the erase coil 108 since the center point asummes 6 V since the value of the resistor 145 is made equal to that of the resistor 143. At this time, the second magnetic head 105 is in readable state.

The magnetic head assembly 14 comprises the above-mentioned first and second magnetic heads 100 and 105 which respectively cover a front or first surface and a rear or a second surface of the floppy disc 12a or 12b.

The first magnetic head 100 comprises the write/read heads 101 and 102, the erase coil 103 and the capacitor 104. All these three coils are controlled at their one ends by way of a common control line, while the other ends receive voltages such that the erase coil 103 receives 5 volts, and the write/read heads 101 and 103 receive 12 volts. On writing operation, the control line is of 0 volt (namely, NAND gate 138 is of "0" and NAND gate 140 is of "1"), so as to drive all the write/read heads 101, 102 and the erase head 103. On reading operation, the control line is of 6 volt (namely, NAND gate 140 is of "0" and NAND gate 138 is of "1"), and thererefore, only the write/read heads 101, 102 are drive without driving the erase head 103.

Similarly, the second magnetic head 105 comprises the write/read heads 106 and 107, the erase coil 108 and the capacitor 109. All these three coils are controlled at their one ends by way of a common control line, while the other ends receive voltages such that the erase coil 108 receives 5 volts, and the write/read heads 106 and 107 receive 12 volts. On writing operation, the control line is of 0 volt (namely, NAND gate 139 is of "0" and NAND gate 141 is of "1"), so as to drive all the write/read heads 106, 107 and the erase head 108. On reading operation, the control line is of 6 volt (namely, NAND gate 141 is of "0" and NAND gate 139 is of "1"), and therefore, only the write/read heads 106, 107 are driven without driving the erase head 108.

The writing circuit 15, delay circuit 16, the erase circuit 17 and the magnetic head assembly 14 all illustrated in FIG. 6 operate as follows.

In FIG. 6, data to be written (see FIG. 2 (b)) indicated at WRITE DATA is fed to a data input terminal 65. In the case of writable state, a write gating signal (see FIG. 2 (h)) indicated at WRITE GATE is fed to a gate input terminal 69 so as to cancel the resetting state of the D flip-flop 68 thereby frequency dividing the write data (FIG. 2 (b)) by two.

Furthermore, in the case of writable state, since the DS INT signal at the terminal 31 and the −POR signal at the terminal 75 are of "1", the transistor 60 remains nonconductive. Therefore, a positive voltage +12 V applied to a terminal 59 is regulated by the regulated power source circuit 15b to be fed to the writing switching circuit 15a.

The input terminal 39 of the writing switching circuit 15a receives the −LS signal which assumes "0" in the case of normal density and "1" in the case of high density so that the writing current I is controlled such that a small writing current flowing only the resistor 57 in the case of normal density or a large writing current flowing both the resistors 57 and 58 in the case of high density is fed to the writing drive circuit 15c.

Write data outputted from the D flip-flop 68 is applied to write/read coils 101, 102, 106 and 107 via diodes 87 to 90 with the writing current I being controlled by the transistors 79 and 84. Writing on the floppy disc 12a or 12b is controlled by the NAND gates 138 or 139 such that one of the first and second magnetic heads 101 and 105 is driven.

The delay circuit 16 and the erase circuit 17 operate as follows. In the delay circuit 16, erasable-indicating signal −ESW fed to the terminal 110 is retarded by way of the MSMV IC 113. The delay time provided by the IC 113 changes depending on a selected density mode such that the delay time is switched to longer value or to a shorter value in response to +CS signal fed through the terminal 43. An output signal from the delay circuit 16 is fed via the NOR gate 125 to the NAND gates 138 to 141.

An erase current is fed from the transistor 122 via diodes 126 and 127 to the erase coils 103 and 108. The erase current is switched by −LS signal at the terminal 39 so that a small current fed via the resistor 134 in the normal density mode or a large current fed via both resistors 134 and 135 in the high density mode is fed to the erase coils 103 and 108. The erase current is also controlled in the same manner as the write current by way of NAND gates 138 and 139 such that one of the first and second magnetic heads 100 and 105 is driven at one time.

During reading out the WRITE GATE signal at the terminal 69 and the −ESW signal at the terminal 110 both become "1" so as to cause the NOR gate 125 to produce "1" for closing NAND gates 138 and 139 and opening NAND gates 140 and 141. At this time, the voltage of the common control line connected to the coils 101 to 103 and 106 to 108 is raised from 0 V to 6 V thereby disabling the erase coils 103 and 108 to which 5 V has been applied. As a result, two out of four read coils 101, 102, 106 and 107 are driven on reading mode, so that a read out signal READ 1 or READ 2 is derived from output terminals 151 and 150.

Now, reading circuits will be described with reference to FIGS. 6, 7A, 7B, 7C and 8.

In FIG. 6, the reference 146 is a diode connected to the coil 107; the reference 147, a diode connected to the coil 102; the reference 148, a diode connected to the coil 106; and the reference 149, a diode connected to the coil 101. Anodes of the diodes 146 and 147 are both connected to the output terminal 150 for deriving READ 2 signal therefrom. Similarly, anodes of the diodes 148 and 149 are both connected to the output terminal 151 for deriving READ 1 signal therefrom. These output terminals 150 and 151 are respectively connected to input terminals of a preamplifier 18 shown in FIG. 7A.

Figure 7A:
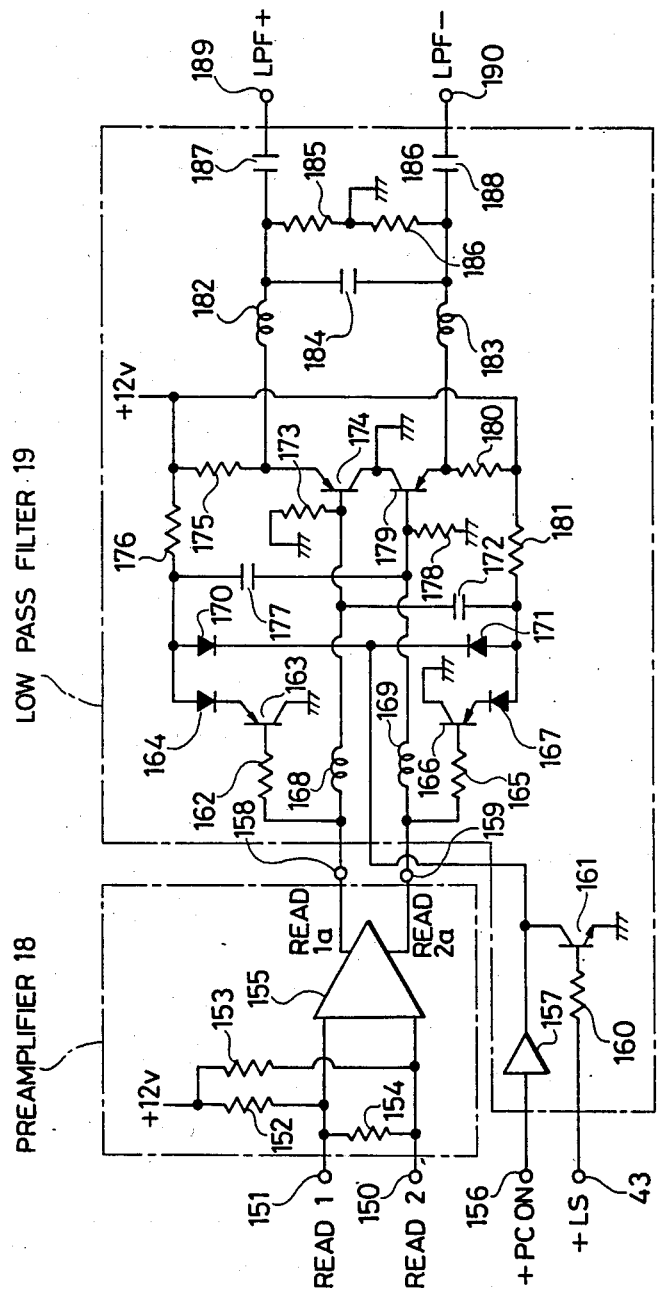
FIG. 7A is a circuit diagram of a preamplifier and a low pass filter both shown in FIG. 3.

FIG. 7A also shows a low pass filter 19 responsive to outputs from the preamplifier 18. In Fig. 7A, the references 152 and 153 are bias resistors connected to +12 V source. These bias resistors 152 and 153 are provided for biasing the coils 101, 102, 106 and 107 via the diodes 146 to 149 respectively. The reference 154 is a resistor which determines the input impedance across the input terminals 151 and 150.

The low pass filter 19 receives +PC ON signal fed to a terminal 156, the +LS signal fed to a terminal 43 and the output signals from the preamplifier 18, i.e. two outputs from a 2-input, 2-output type operational amplifier 155, and outputs LPF+ and LPF− signals at output terminals 189 and 190. The input terminal 156 for receiving the +PC ON (write pre-compensation ON) signal is connected via a buffer amplifier 157 to a junction connecting diodes 170 and 171. This +PC ON signal is fed from a track counter which counts the number of scanned tracks so as to detect a present location of the head on the flopp disc. More specifically, the when the number of tracks is from 0 to 43, the +PC ON signal is of "0" and when the number of tracks is from 44 to 76, then the +PC ON signal is of "1". With this +PC ON signal and the +LS signal fed to the terminal 43, the cutoff frequency of the low pass filter is increased to a higher value when the floppy disc is of high density and an inner track (track 44 to track 76) is being scanned.

The +LS signal fed to the terminal 43 is of "1" in the case of normal density, and is fed via a resistor 160 to base of a transistor 161 to render the same conductive. A positive voltage +12 V is fed via a resistor 176 to anodes of diodes 164 and 170, and to a capacitor 177. The voltage 12 V is also fed via a resistor 181 to anodes of diodes 167 and 171 and to a capacitor 172.

Output signals from the operational amplifier 155 of the preamplifier 18 are designated at READ 1a and READ 2a respectively and are fed via terminals 158 and 159 to the low pass filter 19. The terminal 158 is connected via a coil 168 to the capacitor 172 and base of a transistor 174, while the terminal 158 is connected via a resistor 162 to base of a transistor 163. The emitter of the transistor 163 is connected to cathode of the diode 164, while the collector of the transistor 162 is grounded. The emitter of the transistor 174 is connected via a resistor 175 to the positive voltage +12 V line. Collector of the transistor 174 is grounded while base thereof is grounded via a resistor 173.

Similarly, the terminal 159 is connected via a coil 169 to the capacitor 177 and base of a transistor 179, while the terminal 159 is connected via a resistor 165 to base of a transistor 166. The emitter of the transistor 166 is connected to cathode of the diode 167, while the collector of the transistor 166 is grounded. Emitter of the transistor 179 is connected via a resistor 180 to the positive voltage +12 V line. Collector of the transistor 179 is grounded while base thereof is grounded via a resistor 178.

Emitter of the transistor 174 is connected via a coil 182 to capacitors 184, 187 and a resistor 185 whose other terminal is grounded. The other terminal of the capacitor 187 is connected to the output terminal 189 from which the LPF+ signal is derived. Similarly, emitter of the transistor 179 is connected via a coil 183 to capacitors 184, 188 and a resistor 186 whose other terminal is grounded. The other terminal of the capacitor 188 is connected to the output terminal 190 from which the LPF− signal is derived.

Figure 7B:
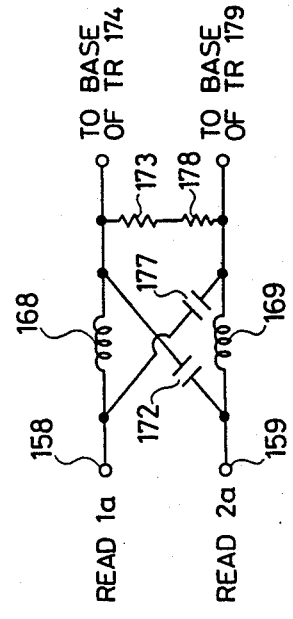
FIG. 7B is an equivalent circuit diagram of the low pass filter in normal density mode.
Figure 7C:
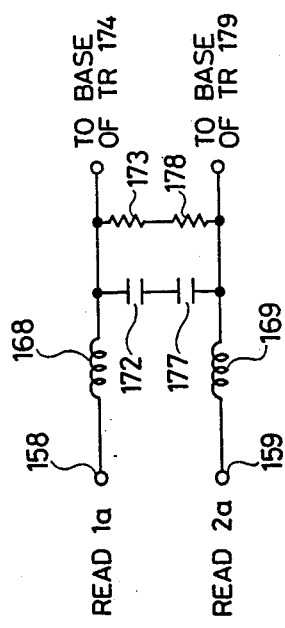
FIG. 7C is an equivalent circuit diagram of the low pass filter in high density mode.

FIGS. 7B and 7C show two equivalent circuits of a part of the low pass filter 19 shown in FIG. 7A. The circuit of FIG. 7B corresponds to a part of the low pass filter 19 used for normal density, while the circuit of FIG. 7C corresponds to the same used for high density. The equivalent circuits of FIGS. 7B and 7C respectively correspond to a portion between input terminals 158 and base electrodes of the transistors 174 and 179. As will be understood from FIG. 7B, the capacitors 172 and 177 are connected in series, and the resistors 173 and 178 are connected in series. These series circuits are connected in parallel between the base electrodes of the transistors 174 and 179. The circuit arrangement of FIG. 7B is formed because the transistor 161 is made conductive so that cathodes of the diodes 170 and 171 are grounded in receipt of the +LS signal which assumes "1" at this time.

On the other hand, in the circuit of FIG. 7C, the capacitors 172 and 177 are connected to the coils 168 and 169 to form a bridge circuit. Other structure is the same as that in FIG. 7B. In this way, the cutoff frequency of the low pass filter 19 is determined respectively for normal density mode and high density mode by the circuit arrangments of FIGS. 7B and 7C such that the cutoff frequency is changed in response to the +LS signal fed to the terminal 43.

The preamplifier 18 and the low pass filter 19 of FIG. 7A operate as follows. Generally speaking, both sides of a floppy disc are not simultaneously scanned for reproduction, and therefore only a single reading out circuit is required. Therefore, reproduction can be effected with a single reading out circuit combining the first and second magnetic heads 100 and 105 into a single system.

Information read out by way of coils 101, 102, 106 and 107 is fed via diodes 146 to 149 to the operational amplifier 155 of the preamplifier 18. One output READ 1a from the operational amplifier 155 is fed via a low pass filter formed of the coil 168 and the capacitor 172 to the transistor 174. The other output READ 2A from the operational amplifier 155 is fed via a low pass filter formed of the coil 169 and the capacitor 177 to the transistor 179.

As described in the above, in the normal density mode since +LS signal is of "1", the transistor 161 is rendered conductive. As a result, current flows from the positive voltage +12 V line via the resistor 176, the diode 170 and the transistor 161 to ground. Similarly, current also flows from the positive voltage +12 V line via the resistor 181, the diode 171 and the transistor 161 to ground. At this time, the diodes 164 and 167 and the transistors 163 and 166 are all reverse biased, and therefore do not operate. For this reason, in the normal density mode the equivalent circuit of FIG. 7B is formed.

On the other hand, in the high density mode, the +LS signal turns "0" rendering the transistor 161 nonconductive. However, in the case that the +PC ON signal fed to the terminal 156 is of "0" representing head position as track 0 to track 43 on a floppy disc, the output of the buffer amplifier 157 is of "0". As a result, the circuit of FIG. 7B can be applied as it is. When the head position is between track 44 and track 76 of the floppy disc 12b, the +PC ON signal is of "1". Therefore, the current from the positive voltage +12 V line cannot pass through the diode 170 after passing through the resistor 176, and thus passes through the diode 164 and the transistor 163. Similarly, the current from the positive voltage +12 V line cannot pass through the diode 171 after passing through the resistor 181, and thus passes through the diode 167 and the transistor 166. As a result, the circuit of FIG. 7C is formed in the case of high density.

Coils 182, 183, capacitor 184 are used for correcting frequency response of the low pass filter 19.

Figure 8:
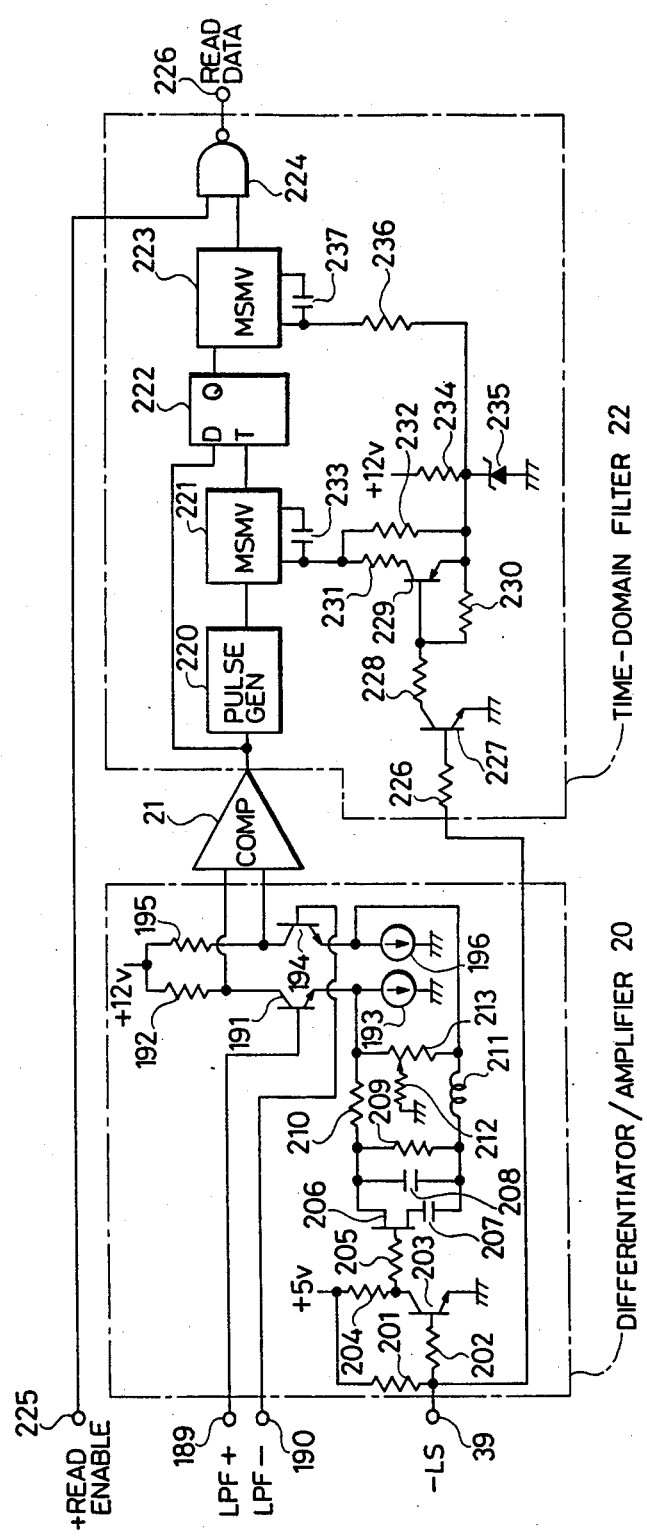
FIG. 8 is a circuit diagram of the differentiator/amplifier, comparator, time-domain filter shown in FIG. 3.

Reference is now made to FIG. 8 which shows the differentiator/amplifier 20 of FIG. 6. In FIG. 8, the reference 39 is an input terminal for receiving the −LS signal assuming "0" in the case of normal densisty and "1" in the case of high density. The references 201, 202 and 204 are bias resistors for a transistor 203. The reference 205 is a bias resistor for an FET (Field Effect Transistor) 206. Across the source and drain of the FET 206 is connected a series circuit of capacitors 207 and 208. A resistor 209 is connected in parallel to the capacitor 208. A series circuit of a resistor 210, a semi-fixed resistor 213 and a coil 211 is also connected in parallel with the capacitor 208. A movable contact of the semi-fixed resistor 213 is connected via a resistor 212 to ground.

The LPF+ signal from the low pass filter 19 is fed via the terminal 189 to base of a transistor 191, while the LPF− signal is fed via the terminal 190 to base of a transistor 194. Collectors of the transistors 191 and 194 are respectively connected to(two input terminals of the comparator 21, and are further connected via respective resistors 192 and 195 to a positive voltage line +12V. Eitters of the transistors 191 and 194 are respectively connected via constant-current sources 193 and 196 to ground. Emitter of the transistor 191 is connected to one terminal of the semi-fixed resistor 213, whiel emitter of the transistor 194 is connected to the other terminal of the the same.

The comparator 21 and the time-domain filter 22 also shown in FIG. 8 will be described. In FIG. 8, −LS signal fed to the terminal 39 is fed via a bias resistor 226 to base of a transistor 227 whose emitter is grounded. Collector of the transistor 227 is connected via a resistor 228 to base of a transistor 229. A bias resistor 230 is connected between base and emitter of the transistor 229, while a series circuit of resistors 231 and 232 is connected between collector and emitter of the same. A junction between the resistors 231 and 232 is connected to a terminal of a MSMV 221. The junction is also connected via a capacitor 233 to another terminal of the MSMV 221. A positive voltage +12 V line is connected via a resistor 234 to emitter of the transistor 229, where the emitter is also connected via a zenner diode 235 to ground. The emitter of the transistor 229 is further connected via a resistor 236 to a terminal of another MSMV 223. A capacitor 237 is interposed between the terminal of the MSMV 223 and another terminal of the same.

The comparator 21 is a voltage comparator so as to produce an output voltage as the result of comparison between two input voltages. The output terminal of the comparator 21 is connected to an input terminal of a pulse generator 220 and to D input terminal of a D flip-flop 222. The pulse generator 220 is responsive to the output voltage from the comparator 21 so as to produce a single pulse of short width when the polarity of the comparator output changes. The MSMV 221 is responsive to the short pulse from the pulse generator 220 so as to produce a signal having a time length determined by a time constant which is determined by the values of the capacitor 233 and the resistors 232 and 231. An output terminal of the MSMV 221 is connected to T input terminal of the D flip-flop 222. Output Q of the D flip-flop 222 is inverted when the signal at the T input terminal is inverted when the signal at D input terminal is of "1". The output Q from the D flip-flop is fed to another MSMV 223 to cause the same to produce an output signal of a given time length when the outputs Q and Q̄ are inverted. The time length of the output signal is determined by a time constant which is determined by the values of the capacitor 237 and the resistor 236.

An output signal from the MSMV 223 is fed to an input terminal of a NAND gate 224 whose another input terminal receives a +READ ENABLE signal from a terminal 225. Therefore, the output signal from the MSMV 224 is fed to an output terminal 226 as READ DATA when +READ ENABLE signal is of "1".

The differentiator/amplifier 20, comparator 21 and time-domain filter 22 of FIG. 8 operate as follows. The output signals LPF+ and LPF− from the low pass filter 19 of FIG. 7A are fed via terminals 189 and 190 to transistors 191 and 194 respectively. In the case of high density, these signals fed to the transistors 191 and 194 are differentiated by way of the coil 211 and the capacitor 207 or 208 (see signal "f" in FIG. 2).

In the case of normal density, since the −LS signal is of "0", the transistor 203 is made nonconductive causing the FET 206 to be conductive. As a result, a differentiator is formed of a parallel circuit of the capacitors 207 and 208, and the coil 211. A resonant frequency of an LC circuit formed of the parallel capacitors 207 and 208, and the coil 211 in the case of normal density is lower than the a resonant frequency of an LC circuit formed of the capacitor 208 and the coil 211 because a resonance frequency "f" is given by the following equation, and because the value of capacitance in high density is greater than that in normal density:

$$f = \frac{1}{2\pi \sqrt{LC}}$$

wherein L and C respectively indicate inductance and capacitance.

Differentiated signals are then fed to the comparator 21 to be compared with each other so that an output signal from the comparator 21 is inverted when the polarity of the two input signals is inverted (see waveform "f" in FIG. 2).

The output signal from the comparator 21 is fed via the pulse generator 220, MSMV 221, D flip-flop 222 to another MSMV 223. This circuit arrangement of the pulse generator 220, MSMV 221, and D flip-flop 222 is provided for preventing center sag portions f1, f2, f3 of the output signal from the differentiator/amplifier 20 (see waveform "f" in FIG. 2) from becoming a cause of malfunction due to noise as follows.

The comparator output is first fed to the pulse generator 220 so that a short pulse is produced when the polarity of the output signal from the comparator 21 is changed. The MSMV 221 is triggerd by the short pulse from the pulse generator 220 where the output signal from the MSMV 221 is of different time length for normal density and high density.

In the case of normal density, −LS signal at the terminal 39 is of "0" rendering the transistor 229 nonconductive, and therefore, the time constant for the MSMV 221 is determined by the capacitor 233 and the resistor 232. On the other hand, in the case of high density, since −LS signal is of "1" rendering the transistor 229 conductive, the time constant is determined by the capacitor 223 and a combined resistance of the resistors 232 and 231.

The D flip-flop 223 is arranged to be triggered at its T input at the end of pulse from the MSMV 221. Therefore, even if noise is mixed with the center sag portions (see f, f2, f3 in waveform "f" in FIG. 2) of the output signal from the differentiator/amplifier 20, the D flip-flop is prevented from malfunctioning since such noise interference is masked and ignored by the width of the output pulse from the MSMV 221.

The output signal from the D flip-flop 222 is waveform shaped by the MSMV 223, and in the case of readable state, the READ ENABLE signal is of "1" so that the output signal from the MSMV is outputted as READ DATA via the output terminal 226.

Figure 9:
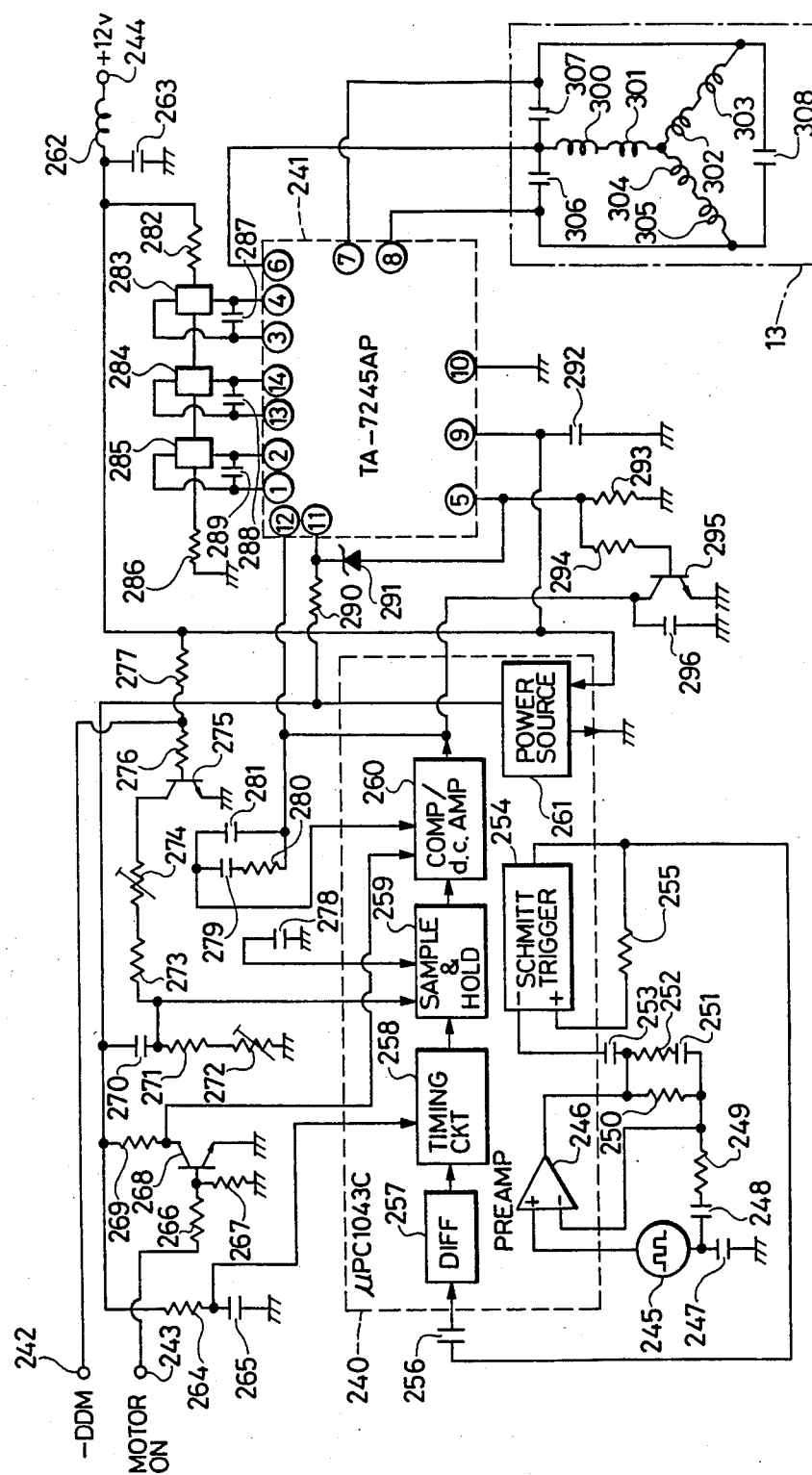
FIG. 9 is a circuit diagram of a motor drive circuit shown in FIG. 3.

FIG. 9 shows the motor drive circuit 13a illustrated as a block in FIG. 3. The motor drive circuit 13a is arranged to drive the motor 13 which is a direct drive type, and which comprises a rotational speed control integrated circuit (IC) 240, a motor drive integrated circuit (IC) 241, and peripheral circuits and elements. As the IC 240 may be used one known as μPC431043C or an equivalent, while as the IC 241 may be used one known as TA-7245AP or an equivalent. The reference 242 is an input terminal for receiving −DDM signal which assumes "0" on normal density and "1" on high density. The reference 243 is an input terminal for receiving a MOTOR ON signal which becomes "1" when driving the motor 13. The reference 244 is a terminal for receiving a positive voltage +12 V. The reference 245 is a frequency generator F.G. or a tachogenerator associated with the motor 13. In detail, the frequency generator 245 comprises a permanent magnet arranged to rotate together with the motor shaft, and a comb-like printed conductor pattern which generates a voltage as the permanent magnet passes thereby. The reference 246 is a preamplifier built in the IC 240, and this preamplifier 246 is responsive to an output signal from the frequency generator 245 at its noninverting input (+). The output terminal of the preamplifier 246 is connected via a resistor 250 to its inverting input terminal (−) which is connected via a series circuit of a resistor 249 and a capacitor 248 to the other terminal of the frequency generator 245. The other terminal of the frequency generator 245 is connected via a capacitor 247 to ground.

A series circuit of a capacitor 251 and a resistor 252 is connected in parallel with the resistor 250. The output terminal of the preamplifier 246 is connected via a capacitor 253 to an inverting input terminal (−) of a schmitt trigger circuit 254 which is also built in the IC 240. An output signal from the schmitt trigger circuit 254 is fed back via a resistor 255 to a noninverting input terminal (+) thereof. This schmitt trigger circuit 254 is used for waveform shaping the input signal at a predetermined threshold, and an output signal thereof is fed via a capacitor 256 to an input terminal of a differentiator 257 also built in the IC 240. A differentiated signal is then fed to a timing circuit 258 which defines a fall time of the differentiated signal by way of a time constant which is determined by a resistor 264 and a capacitor 265.

An output signal from the timing circuit is fed to a sample-and-hold circuit 259 which produces a saw tooth wave signal. The saw tooth wave signal has a slope determined by the time constant defined by a capacitor 270, a resistor 271 and a semi-fixed resistor 272 in the case of normal density. On the other hand, in the case of high density, the slope is determined by these elements 270, 271 and 272 and by a resistor 273 and a semi-fixed resistor 274.

This slope changing between normal density mode and high density mode is effected using −DDM signal from the terminal 242. More specifically, in the normal density mode, since −DDM is of "0", a low voltage is applied via a resistor 276 to base of a transistor 275 rendering the same nonconductive. As a result, the resistor 273 and the semi-fixed resistor 274 do not affect the time constant. On the other hand, in the high density mode, −DDM signal is of "1" to render the transistor 275 conductive. As a result, the semi-fixed resistor 274 is grounded at its one end. Therefore, a combined resistance of the series circuit of the resistors 271 and the 272 and the other series ciruit of the resistors 273 and 274 determines the time constant together with the capacitor 270. In this way the slope of the saw tooth wave is changed. A capacitor 278 is connected to the sample-and-hold circuit 259 for removing noise. A reference voltage which is half the voltage from a power source 261 is applied to a terminal of the sample-and-hold circuit 259, to which terminal the capacitor 278 is connected, via an unshown circuit built in the IC 240. With this arrangement the capacitor 278 removes noise.

The reference 260 is a comparator/d.c. amplifier for producing an output motor control current by comparing the saw tooth wave signal from the sample-and-hold circuit 259 with a reference voltage. The motor control current produced by the comparator/d.c. amplifier 260 is back via a a parallel circuit of a capacitor 281 and a series circuit of a capacitor 279 and a resistor 280, to the comparator/d.c. amplifier 260 for phase correction.

The power source circuit 261 receives a positive voltage +12 V via a coil 262 so as to supply a regulated voltage to a capacitor 270, and resistors 269 and 264 as well as to other circuits via unshown lines.

The MOTOR ON signal fed to the terminal 243 assumes "1" when it is intended to drive the motor 13. In receipt of such "1" MOTOR ON signal, the transistor 268 is rendered conductive. The references 267 and 269 are bias resistors for the transistor 268. As the transistor 268 turns conductive, a "0" signal is fed to the comparator/d.c. amplifier 260 so as to stop the motor 13.

The positive voltage +12 V fed from the terminal 244 is passed through a filter formed of the coil 262 and a capacitor 263 so as to remove noise included in the positive voltage, and is then fed to resistors 282, 277, a capacitor 292, and the power source circuit 261. The positive voltage +12 V fed to the resistor 282 is fed via Hall generators 283, 284, 285 and a resistor 286 to ground.

Two detection terminals of the Hall generator 283 are connected across a capacitor 287, and respectively connected to terminals ③ and ④ of the IC 241. Similarly, two detection terminals of the Hall generator 284 are connected across a capacitor 288, and respectively connected to terminals ⑬ and ⑭ of the IC 241. Similarly, two detection terminals of the Hall generator 285 are connected across a capacitor 289, and respectively connected to the terminals ① and ② of the IC 241.

These Hall generators 283, 284 and 285 are located around coils 300 to 305 of the motor 13 so as to detect angular position of N and S poles of permanent magnets built in the motor 13.

Terminals 11⑥, ⑦, ⑧ of the IC 241 are used for supplying a three-phase a.c. voltage to the coils 300 to 305 of the motor 13. The reference 306 is a capacitor connected between terminals ⑥ and ⑧; the reference 307, a capacitor connected between terminals ⑥ and ⑦; the reference 308, a capacitor connected between terminals ⑦ and ⑧, and these capacitors 306 to 308 are used for correcting phase of the three-phase a.c. voltage. A terminal ⑩ is a ground terminal, and a terminal ⑨ is a +12 V terminal which is connected via a capacitor to ground for removing noise.

A terminal ⑪ of the IC 241 is used for receiving the output voltage from the power source circuit 261 of the IC 240 via a resistor 290, which voltage is used as a reference voltage. The reference voltage at the terminal ⑪ is fed via a zener diode 291 to a terminal ⑤ which is an over-current preventing terminal. This over-current preventing terminal ⑤ is provided to develop a higher voltage when an over current is fed to the motor 13. The higher voltage at the terminal ⑤ is fed via a resistor 294 to a transistor 295 to render the same conductive so as to set the output voltage from comparator/d.c. amplifier 260 equal to zero volt. The reference 293 is a bias resistor connected between the terminal ⑤ and ground, and the reference 296 is a capacitor used for removing noise from the output signal from the comparator/d.c. amplifier 260.

The motor drive circuit 13a operates as follows. In order to start the motor 13, the MOTOR ON signal is set to "1". Then the transistor 268 becomes conductive to cause the comparator/d.c. amplifier 260 to produce "0" output which is fed to a terminal ⑫ of the IC 241 as a start-rotation signal. In response to this start-rotation signal, the IC 241 sends three-phase a.c. voltage from terminals ⑥, ⑦ and ⑧ to the coils 30 0 to 305 of the motor 13. As a result, a rotor (not shown) having permanent magnets receive repulsive forces from some of the coils 300 to 305 to start rotating. The phase and frequency of the three-phase a.c. voltage is adjusted by way of the Hall generators 283 to 285 which detect angular position of the permanent magnets.

As the motor 13 starts rotating in this way, the frequency generator 245 produces an induced voltage detecting the rotation of the permanent magnets. The induced voltage is amplified by the preamplifier 256, and its waveform is shaped by the schmitt trigger circuit 254 so as to form a rectangular pulse signal which is differentiated by the differentiator 257 in turn. An output signal from the differentiator 257 is processed by the timing circuit 258 so as to correct fall time characteristic using a time constant determined by the resistor 264 and the capacitor 265. Then the output signal from the timing circuit 258 is fed to the sample-and-hold circuit 259.

The sample-and-hold circuit 259 produces a saw-tooth wave signal whose slope is changeable between two values depending on a selected mode (normal density mode or high density mode) as described hereinabove.

The comparator/d.c amplifier 260 is responsive to the saw-tooth wave signal from the sample-and-hold circuit 259 so as to compare the same with a reference voltage which corresponds to half of the voltage from the voltage source 261. Such a half voltage is produced within an unshown circuit built in the IC 240. The comparator/d.c. amplifier 260 produces the motor control current so that the rotational speed of the motor either increases or decreases in accordance with the detected rotational speed. The output signal from the comparator/d.c. amplifier 260 is fed to the terminal 12 of the motor drive IC 241 so that the three-phase a.c. voltage fed to the motor 13 is controlled.

The rotational speed of the motor 13 is finely adjusted by the semi-fixed resistor 274 in the case of high density and by the semi-fixed resistor 272 in the case of normal density.

The above-described embodiment is just an example of the present invention, and therefore, it will be apparent for those skilled in the art that many modifications and variations may be made without departing from the scope of the present invention.

What is claimed is:

1. A floppy disc disc drive unit with a motor having a built-in frequency generator for rotating a floppy disc and a magnetic head assembly for writing reading information on off said floppy disc, comprising:
   (a) switching signal generating means for generating a switching signal indicative of a selected mode relating to a magnetic recording characteristic of a floppy disc to be used;
   (b) motor drive means responsive to said switching signal for causing said motor to rotate at different speeds in accordance with said selected mode, said motor drive means comprising:
      (i) sample-and-hold means, responsive to an output signal from said frequency generator built in said motor, for converting said output signal to a saw-tooth wave signal,
      (ii) variable time constant means, coupled to said sample and hold means and responsive to said switching signal, for changing a time constant, thereby changing the slope of said saw-tooth wave signal derived from said sample-and-hold means depending on a selected mode; and
      (iii) comparator means, responsive to said saw-tooth wave signal from said sample-and-hold means and to a reference voltage, for producing a motor speed control signal with the amplitude of said-tooth wave signal which is compared with said reference voltage so that said floppy disc is rotated at a desired rotational speed suitable for a selected mode; and
   (c) a write/read means, coupled to said magnetic head assembly, including: (1) means for generating a write current fed to said magnetic head assembly for writing information, (2) means responsive to said switching signal for controlling a write cuurent fed to said magnetic head assembly so as to write information with a write current suitable for said selected mode, (3) means, responsive to a read out signal from said magnetic head assembly for producing a reproduced signal, and (4) means responsive to said switching signal to process said read out signal with a characteristic suitable for said selected mode.

2. A floppy disc drive unit as claimed in claim 1, wherein said switching signal gnerating means comprises one of a manual switch and a switch responsive to a command signal fed from an external circuit, said switching signal generating means having means for producing a first d.c. voltage which assumes a high level and a low level depending on a selected mode, a second d.c. voltage of a large current which assumes a high level and a low level depending on a selected mode, said first voltage being fed to said write read means, said second d.c. voltage being fed to said motor drive means.

3. A floppy disc drive unit as claimed in claim 1, wherein said write circuit is arranged to change said write current so that data trasfer speed is 250 Kbit/s when a coersive force of said floppy disc is 300 Oersted, and is 500 Kbit/s when a coersive force of said floppy disc is 600 Oersted.

4. A floppy disc drive unit as claimed in claim 1, wherein said means for producing a reproduced signal comprises a low pass filter with a variable cutoff frequency and a differentiator/amplifier with a variable resonance frequency, said cutoff frequency being set to 300 KHz and said resonance frequency being set to 350 KHz in the case that the coersive force of said floppy disc is 300 Oersted, and said cutoff frequency being set to 400 KHz and said resonance frequency being set to 500 KHz in the case that the coersive force of said floppy disc is 600 Oersted.

5. A floppy disc drive unit with a motor for rotating a floppy disc and a magnetic head assebly for writing reading information on from said floppy disc, comprising:
  (a) switching signal generating means for generating a switching signal indicative of a selected mode relating to a magnetic recording characteristic of a floppy disc to be used;
  (b) motor drive means responsive to said switching signal for causing said motor to rotate at different speeds in accordance with said selected mode;
  (c) write means for generating a write current fed to said magnetic head assembly for writing information via a write head of said magnetic head assembly, said write means including means responsive to asid switching signal for controlling a write current fed to said magnetic head assembly so as to write information with a write current suitable for said selected mode;
  (d) delay means for retarding a write-command signal by a variable delay time which is varied in accordance with said switching signal, said delay means comprising:
    (i) a monostable multivibrator;
    (ii) means for providing a time constant, including a resistor and a first capoacitor both connected to said monostable multivibrator;
    (iii) a second capacitor; and
    (iv) switching transistor means, responsive to said switching signal, for causing said second capacitor to be connected to said resistor when said switching transistor means becomes conductive for changing said time constant and for changing said delay time; and
  (e) erase means for supplying an erase current to at least one erase head of said magnetic head assembly to partially erase a portion written by said write head, said erase means being repponsive to said switching signal so as to change the erase current to be suitable for said selected mode, said erase current being fed to said at least one erase head with a timing determined by said delay means, said erase means including second switching transistor means responsive to said switching signal, and first and second resistors selectively connected via said second switching transistor means to form a parallel circuit when said second switching transistor means is conductive, said erase current flowing through said parallel circuit of said first and second resistors when said transistor is conductive and through only said first resistor when said transistor is non-conductive thereby supplying variable erase current suitable to the selected mode to said erase at least one erase head of said meagnetic head assembly.

6. A floppy disc drive unit as claimed in claim 5, wherein said switching signal generating means comprises one of a manual switch and a switch responsive to a command signal fed from an external circuit, said switching signal generating means having means for producing a first d.c. voltage which assumes a high level and a low level depending on a selected mode, a second d.c. voltage which assumes a high level and a low level depending on a selected mode, said first voltage being fed to said write means, said second d.c. voltage being fed to said motor drive means.

7. A floppy disc drive unit as claimed in claim 5, wherein said motor drive means comprises:
  (a) sample-and-hold means responsive to an output signal from a frequency generate built in said motor, for converting said output signal to a saw-tooth wave signal, said sample-and-hold means being connected to a variable time constant circuit which is responsive to said switching signal so as to change the time constant thereby changing the slope of said saw-tooth wave signal derived from said sample-and-hold circuit depending on a selected mode; and
  (b) comparator means responsive to said saw-tooth wave signal from said sample-and-hold circuit and to a reference voltage, for producing a motor speed control signal by comparing an amplitude of said saw-tooth wave with said reference voltage so that said floppy disc is rotated at a desired rotational speed suitable for a selected mode.

8. A floppy disc drive unit as claimed in claim 5, wherein said write means comprises a switching transistor responsive to said switching signal and first and second resistors connected via said transistor to form a parallel circuit when said transistor is conductive, said write current flowing through said parallel circuit of said first and second resistors, when said transistor is conductive and through only said first resistor when said transistor is non-conductive thereby supplying variable write current suitable to the selected mode to said write head of said magnetic head assembly.

9. A floppy disc drive unit with a motor for rotating a floppy disc and a magnetic head assembly for writing reading information on from said floppy disc, comprising:
  (a) switching signal generating means for generating a switching signal indicative of a selected mode relating to a magnetic recording characteristic of a floppy disc to be used;
  (b) motor drive means responsive to said switching signal for causing said motor to rotate at different speeds in accordance with said selected mode;
  (c) read means, responsive to a read out signal from said magnetic head assembly, for producing a reproduced signal, said read means, including: (1) a low pass filter responsive to said read out signal, the cutoff frequency of said low pass filter being changed in accordance with said switching signal, (2) LPF determining means for changing a cutoff frequency of said low pass filter, including coils, capacitors and a switching transistor responsive to said switching signal, said coils and capacitors being connected in one of a lattice network and a ladder network in accordance with a switching state of said transistor; (3) a differentiator/amplifier responsive to an output signal from said low pass filter, said differentiator/amplifier having a resonance frequency of differentiating which is changed in accordance with said switching signal, (2) LPF determining differentiator/amplifier comprising third switching transistor means responsive to said switching signal, a FET connected to said third switching transistor means, a coil and first and second capacitor which form a differenetiating circuit, said first and second capacitors being connected in parallel via said FET when said third switching transistor means is nonconductive so that a differentiating circuit is formed of said coil and the parallel circuit of said first and second capacitors, only said first capacitor being used to form said diffeentiating circuit together with said coil when said FET is non-comductive when said third switching transistor means is conductive; and time-domain filter means, responsive to an output signal from said differentaitor/amplifier, for converting said output signal into a pulse waveform the width of each pulse being changed in accordance with said switching signal, said time-domain filter means comprising:

(i) a fourth switching transistor responsive to said switching signal;

(ii) a time constant circuit having a capacitor and first and second resistors connected to said fourth switching transistor so that time constant is changed in accordance with the switching state of said fourth switching transistor; and (iii) a monostable multivibrator associated with said time constant circuit so that an output pulse width thereof is determined thereby.

10. A floppy disc drive unit as claimed in claim 9, wherein said switching signal generating means comprises one of a manual switch and a switch responsive to a command signal fed from an external circuit, said switching signal generating means having means for producing a first d.c. boltage which assumes a high level and a low level depending on a selected mode, a second d.c. voltage which assumes a high level and a low level depending on a selected mode, said first voltage being fed to said write and/or read circuit, said second d.c. voltage being fed to said motor drive means.

11. A floppy disc drive unit as claimed in claim 9 wherein said motor drive means comprises:

(a) a sample-and-hold circuit responsive to an output signal from a frequency generator built in said motor for converting said output signal to a saw-tooth wave signal, said sample-and-hold circuit being connected to a variable time constant circuit which is responsive to said switching signal so as to change the time constant thereby changing the slope of said saw-tooth wave signal derived from said sample-and-hold circuit depending on a selected mode; and (b) a comparator/d.c. amplifier responsive to said saw-tooth wave signal from said sample-and-hold circuit and to a reference voltage, for producing a motor speed control signal with the amplitude of said saw-tooth wave singal being compared with said reference voltage so that said floppy disc is rotated at a desired rotational speed stable for a selected mode.

* * * * *